United States Patent [19]
Goforth

[11] Patent Number: 4,569,557
[45] Date of Patent: Feb. 11, 1986

[54] EASY ENTRY SEAT ADJUSTER

[75] Inventor: William R. Goforth, Pontiac, Mich.

[73] Assignee: General Motors Corporation, Detroit, Mich.

[21] Appl. No.: 715,912

[22] Filed: Mar. 25, 1985

[51] Int. Cl.⁴ .............................................. B60N 1/04
[52] U.S. Cl. .................................... 297/341; 248/430
[58] Field of Search ................. 297/341; 248/429, 430

[56] References Cited

U.S. PATENT DOCUMENTS

| | | | |
|---|---|---|---|
| 3,931,995 | 1/1976 | Arai | 297/341 |
| 3,940,182 | 2/1976 | Tamura | 297/341 |
| 4,101,169 | 7/1978 | Muraishi et al. | 297/341 |
| 4,159,147 | 6/1979 | Kiyomitsu et al. | 297/341 |
| 4,440,442 | 4/1984 | Drouillard et al. | 297/341 |

Primary Examiner—Francis K. Zugel
Attorney, Agent, or Firm—Herbert Furman

[57] ABSTRACT

An easy entry seat adjuster includes a latch member which is resiliently biased to a latched position and can be manually moved to unlatched position to adjust the seat. When the seat moves to the easy entry position, tilting movement of the seat back moves a blocking member into engagement with the latch member to move the latch member to unlatched position and block return thereof to unlatched position. Movement of the seat from the easy entry position rearwardly engages the latch member with an abutment of the lower track member to release the latch member from the blocking member and permit the blocking member to return to unblocking position and the latch member to latched position.

4 Claims, 4 Drawing Figures

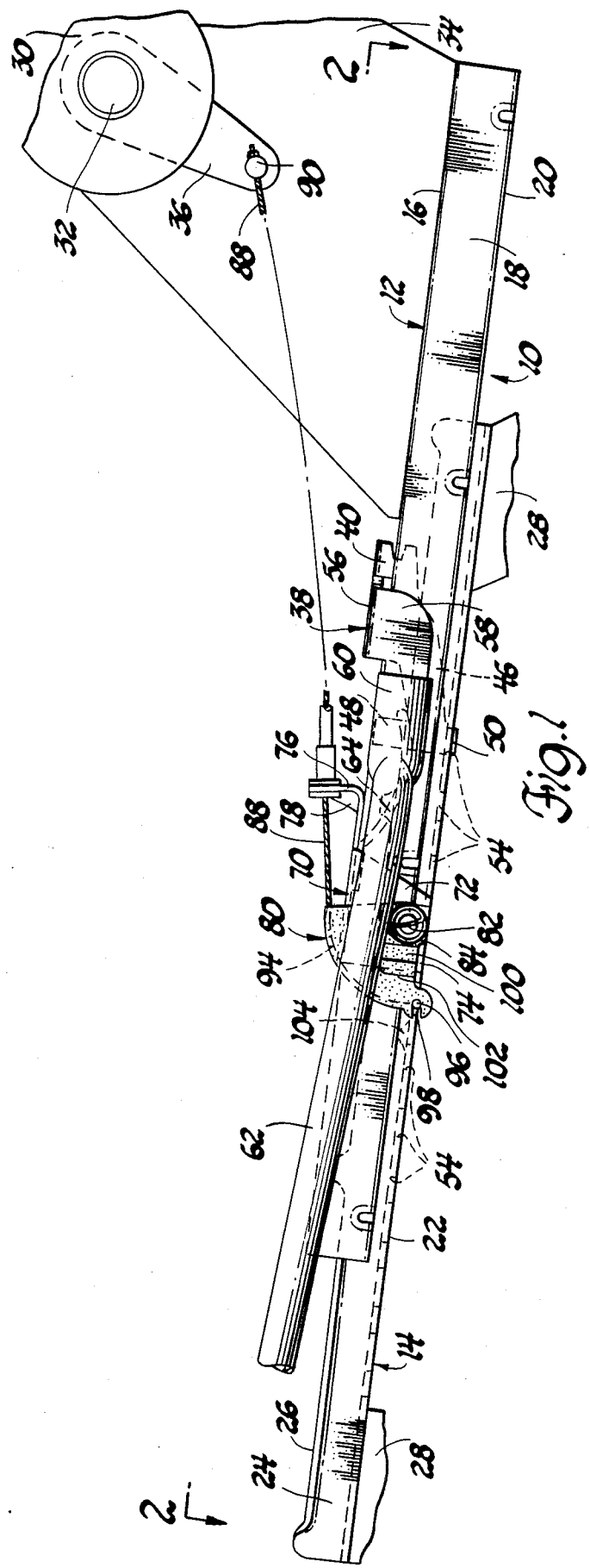

EASY ENTRY SEAT ADJUSTER

This invention relates generally to easy entry seat adjusters and more particularly to such an adjuster which is actuated by tilting movement of the seat back to release a vehicle seat for movement to an easy entry position and return from the easy entry position to a predetermined position.

Easy entry seat adjusters are well known and include various combinations of latches, links and levers for displacing a vehicle seat forwardly to an easy entry position upon tilting movement of a seat back and returning the seat rearwardly to either the initial starting position or a predetermined position.

The easy entry seat adjuster of this invention is intended for use with seat slide structures which include a pair of seat track members located in any one of a plurality of horizontally adjusted positions by a latch member which is resiliently biased to latched position. The latch member is manually movable to a released or unlatched position to permit horizontal adjustment of the track members. The latch member is also movable to unlatched position by a blocking member which is normally resiliently biased to an unblocking position. The blocking member is movable by a seat back actuated cable from the unblocking position to a blocking position wherein it engages and moves the latch member to unlatched position since the output of the blocking member spring is less than that of the latch member spring. The engagement of the latch member with the blocking member under the bias of the latch member spring retains the latch member in unlatched position and the blocking member in blocking position. Thus, the seat can be displaced forwardly to an easy entry position when the seat back is tilted to unlatch the latch member. Since the strength of the latch member spring is greater than that of the blocking member spring, return of the seat back to the upright position has no effect on return of the blocking member to unblocking position.

As the seat is displaced rearwardly from the easy entry position, the latch member engages an abutment and is moved to a more fully unlatched position at approximately the midpoint of the range of adjustment of the seat. This disengages the blocking member from the latch member so that the blocking member returns to an unblocking position and the latch member returns to a latched position.

The primary feature of this invention is that it provides an improved easy entry seat adjuster wherein a seat back actuated blocking member moves a manually operable latch member of the seat slide structure to an unlatched position upon tilting movement of the seat back and retains the latch member in unlatched position during movement of the seat to a forwardly displaced easy entry position and return to a predetermined position. Another feature is that the blocking member is resiliently biased to an unblocking position and is maintained in blocking position against its resilient bias by the resilient bias of the latch member so that return of the seat back to an upright position has no effect on return of the blocking member to unblocking position. A further feature is that the blocking member is released for movement to unblocking position by movement of the latch member to a more fully unlatched position during return of the seat from the easy entry position to a predetermined position in its horizontal range of adjustment.

These and other features will be readily apparent from the following specification and drawings wherein:

FIG. 1 is a side elevational view of an easy entry vehicle seat adjuster according to this invention.

FIG. 2 is a top plan view.

Figure 4:
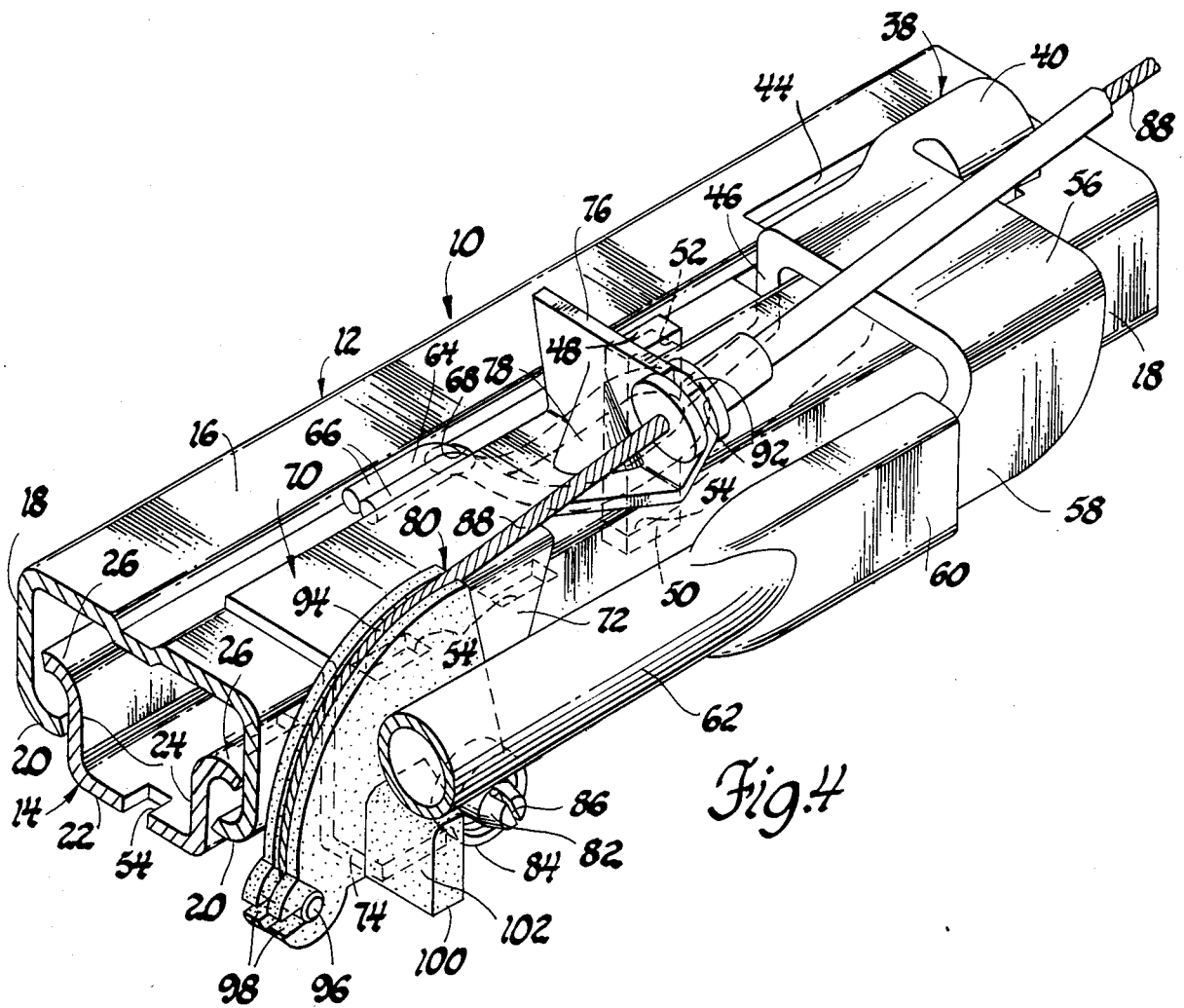
FIG. 4 is a partial perspective view.

Referring now particularly to FIG. 1 of the drawings, a seat slide structure designated generally 10 includes an upper track member 12 and a lower track member 14. As best shown in FIG. 4, the upper track member 12 includes a base wall 16, a pair of side walls 18 and a pair of arcuate terminal flanges 20. The lower track member 14 likewise includes a base wall 22, a pair of side walls 24 and a pair of arcuate terminal flanges 26, with walls 22 and 24 being located in spaced opposed relationship to respective walls of the track member 12 and flanges 26 being located in spaced opposed relationship to the flanges 20. The track member 12 is supported on the track member 14 for relative horizontal movement by a pair of bearing assemblies which are disclosed and claimed in copending applications Ser. No. 555,129, Rees et al, filed Nov. 25, 1983, and Ser. No. 709,881, Rees, filed Mar. 8, 1985.

The lower track member 14 is supported on the vehicle, not shown, in a suitable manner, such as by front and rear brackets 28 schematically indicated in FIG. 1. The upper track member 12 supports a vehicle seat which includes a seat cushion, not shown, and a seat back 30 which is pivoted at 32 to a bracket 34 fixed to the base wall 16 of upper track member 12 for movement between an upright position, as shown, and a forwardly tilted position, not shown, counterclockwise of its position shown. A lever 36 is fixed to the seat back 30 for movement therewith for a purpose to be described.

Figure 3:
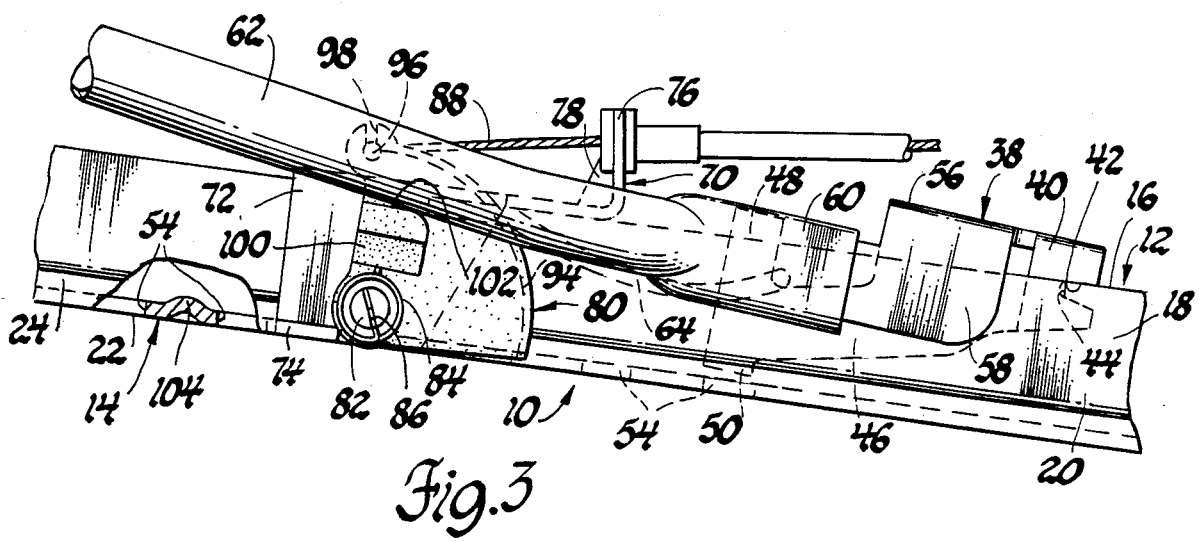
FIG. 3 is an enlarged partially broken away view of a portion of FIG. 1.

The upper track member 12 is held in any one of a plurality of horizontally adjusted positions relative to the lower track member 14 by a latch arrangement which is disclosed and claimed in copending application Ser. No. 709,882, Rees, filed Mar. 8, 1985. Generally, this latch arrangement includes a latch member 38 having a U-shaped body portion 40 which is slotted at 42, FIG. 3. The slot 42 receives the rearward edge portion of a generally rectangular opening 44 in the base wall 16 of the upper track member 12 to pivotally and slidably mount the latch member 38 on the upper track member 12 for movement between a latched position as shown in FIGS. 1, 2 and 4 and an unlatched position as shown in FIG. 3, slightly clockwise of its latched position.

The latch member 38 includes a latch portion 46 which extends inwardly of the opening 44 and forwardly of the track member 12 and terminates in a pair of oppositely extending latch arms or lugs 48 and 50. The lug 48 moves vertically within an opening 52 in the base wall 16 of the upper track member 12 and the lug 50 is receivable in any one of a plurality of openings 54 in the base wall 22 of the lower track member 14 to latch the upper track member to the lower track member in a horizontally adjusted position. The latch member 38 further includes an arm 56 which extends laterally and outwardly of the upper track member 12 and terminates in an operating arm or portion 58 which receives the rear flattened end 60 of a manual operator 62. The operator is shown as a tubular member but could be shaped otherwise if desired.

The latch member 38 is biased to its latched position by a longitudinally and laterally bowed or arcuate hairpin type spring 64, FIGS. 1 and 2, which encircles the lug 48 and seats on the latch portion 46 adjacent this lug. The free ends 66 of the spring extends upwardly through an opening 68 in the base wall 16 of track 12.

A bracket 70 is fixed to the upper wall 16 of track member 12. The bracket includes a lateral flange 72 which depends therefrom along one side wall 18 of the track member 12 and terminates in a lateral tab 74 for a purpose to be described. An integral slotted flange 76 extends upwardly from the bracket 70. A reinforcement rib 78 is provided between the flange 76 and the bracket.

A sector shaped blocking member 80 of plastic material is pivoted at 82 to the flange 72 of the bracket 70. A coil torsion spring 84 has one end secured within a slot 86 of the pivot 82 and the other end anchored to the blocking member 80 to bias the blocking member counterclockwise to its unblocking position as shown in FIGS. 1 and 4. The blocking member is located in this position, by engagement with the tab 74 of the bracket 70. The output force of the spring 84 is much less than that of the spring 64 for a purpose to be described.

A sheathed cable 88 has its rearward end anchored at 90 to the arm 36. The forward end of the sheath of the cable is peripherally slotted and received within the slot 92 of flange 76 to anchor the sheath to the bracket 70. The cable extends through a groove 94 in the periphery of the blocking member 80. The forward end of the cable has a pin 96 secured thereto which is received within a slot 98 of the blocking member to anchor the cable 88 between the seat back 30 and the blocking member 80.

When the seat is in any horizontally adjusted position and it is desired to move the seat to a new position, the operator 62 is manually lifted to pivot the latch member 38 clockwise, as viewed in FIG. 3, to its unlatched position against the bias of the spring 64. This moves the lug 50 out of the opening 54 so that the upper track member 12 and the seat can be horizontally adjusted relative to the lower track member 14. The blocking member remains in unblocking position, FIGS. 1, 2 and 4, against the tab 74 under the bias of the spring 84.

When it is desired to move the seat to the easy entry forwardly displaced position, the seat back 30 is tilted forwardly or rotated counterclockwise about the pivot 32 as viewed in FIG. 1. This shifts the cable 88 rearwardly and rotates the blocking member 80 clockwise about its pivot 82 from its unblocking position shown in FIGS. 1 and 4 to its blocking position shown in FIG. 3. As the blocking member 80 is rotated to the blocking position, an integral tab or lug 100 of the blocking member rotates the operator 62 from its FIG. 4 position to its FIG. 3 position wherein the operator seats on wall 102 of the lug 100 and concurrently moves the latch member 38 to its unlatched position. The seat can then be displaced forwardly to the easy entry position.

Should the seat back be returned to its upright position as the seat is being displaced forwardly or after displacement thereof, the latch member 38 will remain in its unlatched position since the force of spring 64 on the latch member and operator 62 maintains the blocking member 80 in blocking position over the bias of spring 84.

Upon rearward movement of the seat from the easy entry position, the latch lug 50 will engage a dimple or abutment 104, FIG. 3, which is located in the base wall 22 of the lower track 14 approximately at the midpoint in the range of adjustment of track member 12 relative to track member 14. When the lug 50 engages the abutment 104, the latch member 38 is rotated slightly clockwise to a more unlatched position so that the operator 62 is lifted off the wall 102 of lug 100. Spring 84 thereupon rotates the blocking member 80 counterclockwise to its unblocked position. As soon as the latch lug passes the abutment 104, spring 64 returns the latch member 38 to its latched position wherein it will engage either the immediate opening 54 or the next successive opening 54 rearwardly or to the right of abutment 104. Any further adjustment of the seat can thereafter be accomplished in a manner previously described herein.

Thus this invention provides an improved easy entry seat adjuster.

The embodiments of the invention in which an exclusive property or privilege is claimed are defined as follows:

1. In a vehicle seat including a seat cushion and a seat back supported on the cushion for tilting movement between an upright position and a tilted position, an easy entry seat adjuster comprising, a pair of track members for mounting the seat on a vehicle for movement to a plurality of adjusted positions and an easy entry position, a latch member mounted on one track member for movement between an unlatched position and a latched position wherein a latch portion thereof is engageable with one of a series of openings in the outer track member to latch the track members to each other and locate the seat in an adjusted position, first resilient means biasing the latch member to latched position, a blocking member rotatably mounted on the one track member for movement between an unblocking position relative to the latch member and a blocking position wherein the blocking member blocks movement of the latch member from unlatched position to latched position, second resilient means of lesser output than the first resilient means biasing the blocking member from blocking position to unblocking position, means coupling the blocking member to the seat back to rotate the blocking member to blocking position upon tilting movement of the seat back and engage the blocking member with the latch member to move the latch member to unlatched position, the bias of the first resilient means on the latch member holding the latch member against the blocking member to maintain the blocking member in blocking position against the bias of the second resilient means should the seat back be returned to the upright position, the seat and one track member being movable from an initial starting position to the easy enter terminal position upon movement of the latch member to unlatched position by the blocking member, and means actuated during movement of the seat and one track member from the easy entry position toward the initial starting position for moving the latch member out of engagement with the blocking member to permit the second resilient means to rotate the blocking member to unblocking position and to permit the first resilient means to return the latch member to latched position in engagement with the other track member.

2. In a vehicle seat including a seat cushion and a seat back supported on the cushion for tilting movement between an upright position and a tilted position, an easy entry seat adjuster comprising, a pair of track members for mounting the seat on a vehicle for movement to a plurality of adjusted positions and an easy entry position, a latch member mounted on one track member for movement between a latched position wherein the latch member is engageable with the other track member to latch the track members to each other and an unlatched position wherein the latch member is disengaged from the other track member, first resilient means biasing the latch member to latched position, means for moving the latch member to unlatched position, a blocking member mounted on the one track member for movement between an unblocking position relative to the latch member and a blocking position wherein the blocking member engages the latch member and blocks movement of the latch member from unlatched position to latched position, second resilient means of lesser output than the first resilient means biasing the blocking member from blocking position to unblocking position, means coupling the blocking member to the seat back to move the blocking member to blocking position upon tilting movement of the seat back and engage the blocking member with the latch member to move the latch member to unlatched position without operation of the moving means, the bias of the first resilient means on the latch member holding the latch member in engagement with the blocking member to maintain the blocking member in blocking position against the bias of the second resilient means should the seat back be returned to the upright position, the seat and one track member being movable from an initial starting position to the easy entry position upon movement of the latch member to unlatched position by the blocking member, and means operable during movement of the seat and one track member from the easy entry position toward the initial starting position for temporarily disengaging the latch member and the blocking member to (1) permit the second resilient means to move the blocking member to unblocking position and (2) permit the first resilient means to return the latch member to latched position in engagement with the other track member.

3. In a vehicle seat including a seat cushion and a seat back supported on the cushion for tilting movement between an upright position and a tilted position, an easy entry seat adjuster comprising, a pair of track members for mounting the seat on a vehicle for movement to a plurality of adjusted positions and an easy entry position, a latch member mounted on one track member for movement between an unlatched position and a latched position wherein a latch arm thereof is engageable with one of a series of openings in the other track member to latch the track members to each other and locate the seat in an adjusted position, first resilient means biasing the latch member to latched position, a blocking member including a blocking abutment, means rotatably mounting the blocking member on the one track member for movement between an unblocking position relative to the latch member and a blocking position wherein the blocking member shoulder engages the latch member and blocks movement of the latch member from unlatched position to latched position, torsion spring means of lesser output than the first resilient means rotatably biasing the blocking member from blocking position to unblocking position, means coupling the blocking member to the seat back to rotate the blocking member to blocking position upon tilting movement of the seat back and engage the blocking member shoulder with the latch member to move the latch member to unlatched position, the bias of the first resilient means on the latch member holding the latch member against the blocking member shoulder to maintain the blocking member in blocking position against the bias of the torsion spring means should the seat back be returned to the upright position, the seat and one track member being movable from an initial starting position to the easy enter terminal position upon movement of the latch member to unlatched position by the blocking member, and abutment means engaged by the latch arm during movement of the seat and one track member from the easy entry position toward the initial starting position for temporarily moving the latch member past the unlatched position and out of engagement with the blocking member to permit the torsion spring means to rotate the blocking member to unblocking position and permit the first resilient means to return the latch member to latched position.

4. In a vehicle seat including a seat cushion and a seat back supported on the cushion for tilting movement between an upright position and a tilted position, an easy entry seat adjuster comprising, a pair of track members for mounting the seat on a vehicle for movement to a plurality of adjusted positions and an easy entry position and including opposed base walls, a latch member including a pair of latch arms, means mounting the latch member on one track member for movement between an unlatched position wherein one latch arm thereof engages within an opening in the base wall of the one track member and a latched position wherein the one latch arm engages within the one opening and the other latch arm is engaged with one of a series of openings in the base wall of the other track member to latch the track members to each other and locate the seat in an adjusted position, first resilient means biasing the latch member to latched position, a blocking member rotatably mounted on the one track member for movement between an unblocking position relative to the latch member and a blocking position wherein the blocking member blocks movement of the latch member from unlatched position to latched position, second resilient means of lesser output than the first resilient means biasing the blocking member from blocking position to unblocking position, means coupling the blocking member to the seat back to rotate the blocking member to blocking position upon tilting movement of the seat back and engage the blocking member with the latch member to move the latch member to unlatched position, the bias of the first resilient means on the latch member holding the latch member against the blocking member to maintain the blocking member in blocking position against the bias of the second resilient means should the seat back be returned to the upright position, the seat and one track member being movable from an initial starting position to the easy entry terminal position upon movement of the latch member to unlatched position by the blocking member, and abutment means on the base wall of the other track member engaged by the other latch arm during movement of the seat and one track member from the easy entry position toward the initial starting position for temporarily moving the latch member out of engagement with the blocking member to permit the second resilient means to rotate the blocking member to unblocking position and to permit the first resilient means to return the latch member to latched position in engagement with the other track member.

* * * * *